United States Patent

Schulte

Patent Number: 5,797,586
Date of Patent: Aug. 25, 1998

[54] FLOW REGULATING VALVE

[76] Inventor: Franz Schulte, Siemensstrasse 7, 59557 Lippstadt, Germany

[21] Appl. No.: 782,253

[22] Filed: Jan. 14, 1997

[51] Int. Cl.[6] ................................................ F16K 31/02
[52] U.S. Cl. .......................... 251/129.02; 251/129.16; 251/129.17
[58] Field of Search ................... 251/129.02, 52, 251/129.16, 129.17; 335/279, 281

[56] References Cited

U.S. PATENT DOCUMENTS

| | | | |
|---|---|---|---|
| 1,603,005 | 10/1926 | Flam . | |
| 2,461,615 | 2/1949 | Taylor | 251/129.16 |
| 2,465,036 | 3/1949 | Ray | 251/129.16 |
| 2,599,872 | 6/1952 | Slonneger | 251/52 |
| 3,134,932 | 5/1964 | Ray | 251/129.17 |
| 3,143,131 | 8/1964 | Spencer . | |
| 3,210,041 | 10/1965 | Mitts . | |
| 3,943,029 | 3/1976 | Mundt et al. . | |
| 4,170,339 | 10/1979 | Ueda et al. . | |
| 4,196,751 | 4/1980 | Fischer et al. . | |
| 4,252,296 | 2/1981 | Berg . | |
| 4,556,028 | 12/1985 | Wietschorke et al. | 251/129.02 |
| 4,852,605 | 8/1989 | Gouhier . | |
| 4,889,314 | 12/1989 | Hashizume et al. | 251/129.02 |
| 5,280,882 | 1/1994 | Kamiya et al. | 251/129.02 |

FOREIGN PATENT DOCUMENTS

| | | | |
|---|---|---|---|
| 1328882 | 12/1963 | France . | |
| 73 24 333 | 6/1973 | Germany . | |
| 37 19 785 A1 | 12/1988 | Germany . | |
| 40 22 395 A1 | 1/1992 | Germany . | |
| 219177 | 9/1991 | Japan | 251/129.16 |

*Primary Examiner*—Denise L. Ferensic
*Assistant Examiner*—John Ball
*Attorney, Agent, or Firm*—Griffin, Butler Whisenhunt & Szipl, LLP

[57] ABSTRACT

A flow regulating valve for negative pressure has a housing (1,2) which is divided into first and second chambers(4,5) by a suspended membrane (3). The first chamber has an outlet opening (6) at which a valve seat (22) is positioned. An electromagnet (12) with a disc armature (14) is mounted in the second chamber. The membrane supports at its center a shutting plug (9). The disc armature is linked to the center of the membrane via a lever system which transmits movement of the disc armature. The disc armature is formed as a hinged armature.

13 Claims, 1 Drawing Sheet

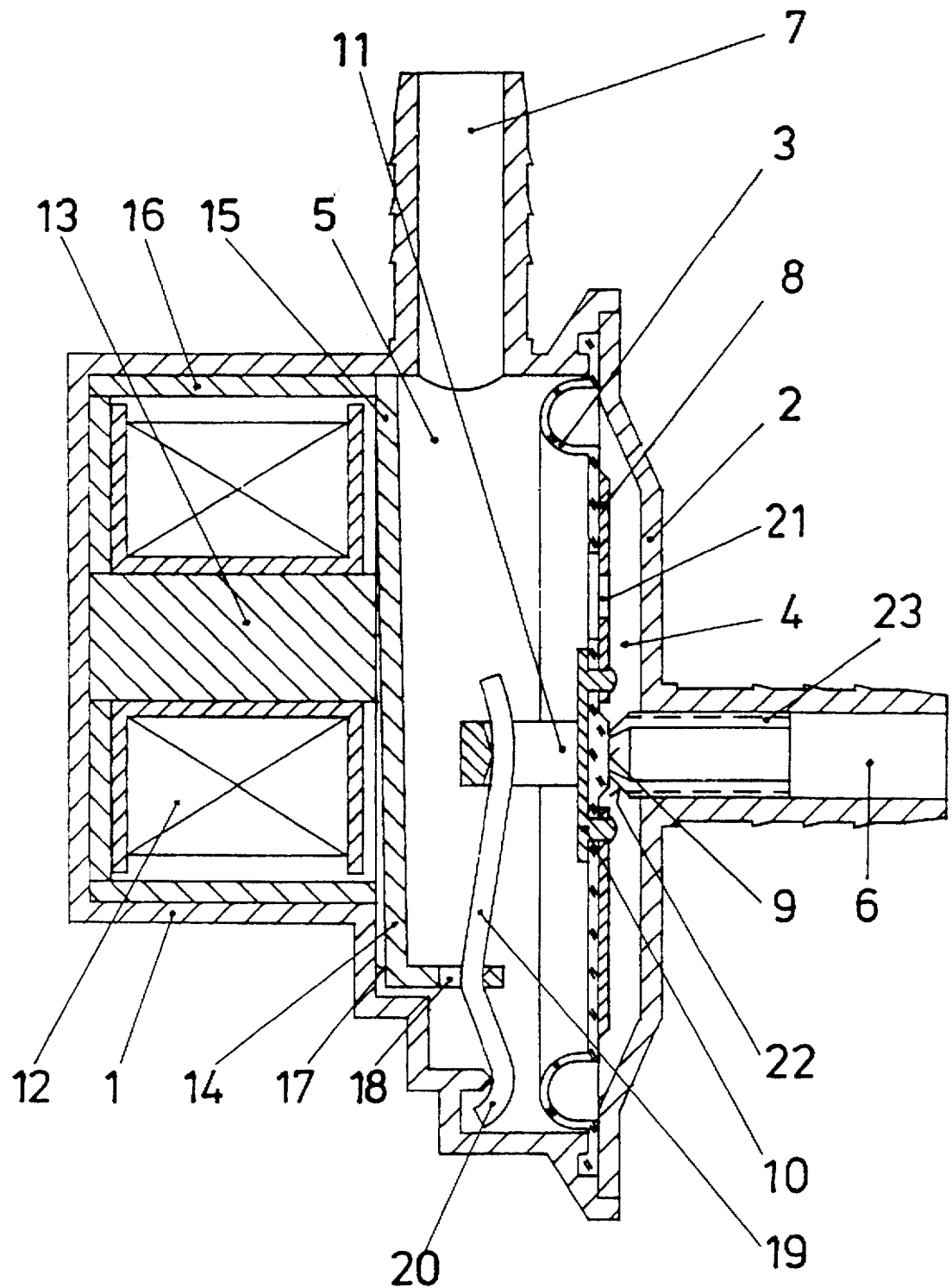

FLOW REGULATING VALVE

BACKGROUND OF THE INVENTION

This invention concerns flow regulating valves for negative pressure, of a type which has at least a two piece housing with a supply inlet and an outlet opening, a valve seat and an electromagnetically-coupled plug or poppet.

In known flow regulating valves, shutting plugs are manipulated by plunger-type armatures of electromagnets. Thus, the shutting plugs have sufficiently large adjusting paths, however, in order to ensure that the electromagnets have sufficiently great opening forces, they must have great capacities and large sizes. Further, such a valve has a tendency to flutter and thereby create loud noises.

It is an object of this invention to provide a modified regulating valve of the type mentioned above that, for a given electromagnet, employs the greatest magnetic force and, indeed, with a sufficiently long path of a shutting plug.

SUMMARY OF THE INVENTION

According to principles of this invention, a flow regulating valve has the following features:

a housing is divided into two chambers by a membrane;

the first chamber has an outlet opening and the second chamber has a supply inlet;

the two chambers are coupled with one another via a restriction opening;

a valve seat is arranged at the outlet opening;

a shutting plug is attached to a center of the membrane;

an electromagnet is positioned in the second chamber having a disc armature; and the disc armature engages about a lever system which transmits a travel path of the disc armature at the center of the membrane.

BRIEF DESCRIPTION OF THE DRAWING

The invention is described and explained in more detail below using the embodiments shown in the drawing. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawing in which reference characters refer to the same parts. The drawing is not necessarily to scale, emphasis instead being placed upon illustrating principles of the invention in a clear manner.

The FIGURE is a cross sectional view of a preferred embodiment of a flow regulating valve of this invention.

DESCRIPTION OF THE PREFERRED EMBODIMENT

A flow regulating valve has a housing formed of two pieces 1, 2 which is divided to form a first chamber 4 and a second chamber 5 by a membrane 3, which is clamped at its outer edge between the housing parts 1, 2. Each of the two housing parts 1, 2 is made of a resinous plastic material. The housing first chamber 4 has an outlet opening 6 which is coupled with a negative-pressure source and the first chamber 5 has a supply inlet 7. A reinforcing plate 8 is concentrically mounted on a down-stream side surface of the membrane 3 which stiffens the membrane 3 radially outwardly to its circular outer periphery. In this manner it is prevented that the membrane 3 takes on a wavy shape when it flexes through.

The membrane 3 is thickened at its center so as to extend through a central opening of the support plate 8 and to form a shutting plug, or valve poppet. A plate 10 that is mounted on an upstream surface of the membrane, opposite the side on which the support plate 8 is located, is coupled to the support plate 8 so as to clamp the membrane 3 therebetween. A first clevis 11 is formed on the plate 10. The first chamber 4 and the second chamber 5 communicate with one another through a restriction opening 21. The restriction opening 21 passes through the support plate 8 as well as through the membrane 3, with the opening of the support plate 8 determining the size of the restriction opening 21. The shutting plug 9 cooperates with a valve seat 22 which is formed by an end surface of a cylindrical sleeve 23 screwed into the outlet opening 6 to be axially adjustable by means of a spiral thread.

An electromagnetic coil 12 is mounted on a floor wall of the housing part 1 encircling a magnetic core 13. A yoke 16 is mounted between a sidewall of the housing part 1 and the electromagnetic coil 12, to be magnetized by the electromagnetic coil 12. A magnetic armature, formed as a disc armature 14, is configured as a hinged armature. A side edge 15 of the hinged armature is hingedly, rotatably, engaged against the yoke 16, which serves as a fulcrum blade. In this arrangement, a height position of this fulcrum engagement is chosen so that a rear side 17 of the hinged armature, in an attracted position (that is when the valve is opened), lies at least substantially against an end surface of the magnet core 13. When the valve is closed, a space between the rear side 17 of the hinged armature and the electromagnet is wedge-shaped and quite small, particularly in an area of the magnet core 13. This means that a magnetic force of the electromagnet even at a beginning of the effective force, is quite large. On the side opposite the fulcrum engagement of the hinged armature, there is a second clevis 18. The lever 19 passes through the first and second devises 11 and 18, with one end 20 having a pivotal engagement with a fulcrum blade formed by the first housing part 1.

A flow regulating valve of this invention functions as follows:

as soon as the negative-pressure source begins operating, a negative pressure appears at the outlet opening 6. The shutting plug 9 is sucked against the valve seat 22. When the electromagnet is energized, the disc armature 14 is attracted and opens the valve by lifting the shutting plug 9 from the valve seat 22. When this is done, a movement path, in the middle of the disc armature 14, is transmitted by the disc armature itself. A further movement transmission results by means of the single-arm lever 19. When the valve is opened, air or a gas is sucked through the supply inlet 7. This air or this gas reaches the second chamber 5 and, through the restriction opening 21, into the first chamber 4. Thus, a negative pressure is created in the chamber 4 relative to the chamber 5. If the electromagnet is de-energized, the shutting plug 9 will be pulled against the valve seat 22 by the negative pressure in chamber 4.

If one wishes to change the operating characteristics of the valve such that an intersection with a current flow in a coordination system changes, one can achieve this by adjusting the position of the valve seat 22; that is, by changing an air space between the valve seat 22 and the shutting plug 9. This adjustment is carried out by turning the sleeve 23 which is mounted in the outlet opening 6 by threads.

In a preferred embodiment of the invention, the lever is constructed as single-arm lever (applied force and transmitted force are on the same side of the fulcrum). This avoids an inconvenient guide system as would be necessary with a two-arm lever (applied force and transmitted movement are on opposite sides of the fulcrum) because a one arm lever transmits force and movement in the same effective direction.

Further, a flow regulating valve of this invention is arranged such that a first end portion of the lever is fulcrumed against a fixed edge of the housing part which forms the second chamber, with its second opposite end portion engaging in a first clevis arranged at a central area of the membrane.

Further, it is beneficial that the disc armature is formed as a hinged armature whose lateral edge surface, at one lateral edge, is hingedly, or "fulcrumly", engaged with a fixed part beside the magnet coil and that it engages, with a second clevis thereof at an appositely-located lateral edge, relative to the center of the membrane; with a high position of the fulcrum engagement being chosen such that the rear side of the hinged armature has the same high (or opened) position as does the end edge of the magnet core in this area. In such an embodiment, a space between the disc armature and the magnet core is particularly small; thus the magnetic force is particularly large and the magnetic armature itself also functions as a transmitting lever along the movement path in an area of the magnet core.

Further beneficial enhanced embodiments of the flow regulating valve of this invention are possible.

A flow regulating valve of this invention is particularly suitable, in a beneficial manner, for use as a regulating valve in a fuel-vapor control system. This system is based on a controlled adsorption-desorption-sequence in an activated-carbon fixed bed adsorption unit. This arrangement ensures that hydrocarbon vapors are not released to atmosphere but rather are adsorbed by activated carbon. While a motor vehicle is driven, a partial stream of fresh air for combustion flows through the adsorber in a reverse direction and desorbs previously captured hydrocarbon vapors. This partial stream is directed through the adsorber only when the motor is loaded so that no increase in exhaust emission results. In known regulating valves which are used for this, a flow time, along with a flow amount, is determined by motor management and from a strength of a negative pressure. However, it is desirable to have a negative pressure which is independent of flow time, so that, particularly during idling of the motor in which the largest negative pressures are created, not to get an increase in rpms because of an additional supply of hydrocarbon vapors. This is achieved by the regulating valve of this invention.

While the invention has been particularly shown and described with reference to a preferred embodiment, it will be understood by those of ordinary skill in the art that various changes in form and detail may be made therein without departing from the spirit and scope of the invention.

The invention claimed is:

1. Flow regulating valve for negative pressures, which has at least a two piece housing with a supply inlet and an outlet opening, a valve seat and an electromagnetically operated shutting plug, wherein:

the housing is divided into two chambers by a membrane;

the first chamber has the outlet opening and the second chamber has the supply inlet;

both chambers communicate with each other through a restriction opening;

the valve seat is arranged in the outlet opening;

the shutting plug is affixed to a central area of the membrane; an electromagnet is positioned in the second chamber and includes a disc armature;

the disc armature is linked to the central area of the membrane via a force-transmitting lever, the lever being arranged as a one-arm lever, a first end portion of which abuts against a fixed edge of a first housing piece and a second end portion of which engages the central area of the membrane, the disc armature engaging the lever between the first and second end portions.

2. Flow regulating valve as in claim 1 wherein the second end portion of the lever engages in a first clevis arranged on the central area of the membrane.

3. A flow regulating valve as in claim 1 wherein the disc armature is formed as a hinged armature having a first lateral edge for pivoting at a fulcrum on a fixed structure positioned adjacent the magnet coil and engaging the lever with a second clevis opposite the fulcrum on the other side of the central area of the membrane, whereby a high position of the fulcrum is chosen so that a rear side of the hinged armature has the same high position as an end surface of the magnet core upon activation of the electromagnet.

4. Flow regulating valve as in claim 1 wherein the membrane includes a stiffening plate mounted on the membrane to sandwich the membrane between the stiffening plate and another member.

5. Flow regulating valve as in claim 4 wherein the stiffening plate has an annular shape.

6. Flow regulating valve as in claim 5 wherein the membrane has a thickened portion at the central area which extends into a central opening of the stiffening plate for forming the shutting plug.

7. Flow regulating valve as in claim 4 wherein a first clevis is formed on the other member which is attached to the stiffening plate of the membrane, with the membrane being clamped between the other member and the stiffening plate.

8. Flow regulating valve as in claim 5 wherein the restriction opening is in the membrane and also in the stiffening plate and a diameter of the opening in the stiffening plate determines the size of the restriction opening.

9. A flow regulating valve as in claim 1 wherein the membrane is suspended between the two housing parts.

10. Flow regulating valve as in claim 1 wherein the valve seat is formed by an end surface of an axially-adjustable sleeve mounted in the outlet opening by means of a screw thread.

11. Flow regulating valve as in claim 7 wherein the other member is arranged in the central area of the membrane and is formed as one piece with the lever.

12. Flow regulating valve as in claim 7 wherein the other member is arranged in the central area of the membrane and has thereon a shoulder that passes through the central area of the membrane with a facing surface which serves as a highly elastic shutting plug for sealing.

13. Flow regulating valve as in claim 1 wherein the valve is used as a regulating valve for a fuel vapor control system for motor vehicles.

\* \* \* \* \*